United States Patent [19]
Ochi et al.

[11] Patent Number: 4,864,424

[45] Date of Patent: * Sep. 5, 1989

[54] VIDEO SIGNAL RECORDING/REPRODUCING APPARATUS

[75] Inventors: Atsuo Ochi, Kadoma; Masaaki Kobayashi, Kawanishi; Akihiro Takeuchi, Ikoma; Kazuhiro Yamanishi, Kashiwara, all of Japan

[73] Assignee: Matsushita Electric Industrial Co., Ltd., Osaka, Japan

[*] Notice: The portion of the term of this patent subsequent to Mar. 7, 2006 has been disclaimed.

[21] Appl. No.: 947,414

[22] Filed: Dec. 24, 1986

[30] Foreign Application Priority Data

Dec. 26, 1985 [JP] Japan .................................. 60-293762

[51] Int. Cl.⁴ ........................ H04N 5/782; H04N 9/79
[52] U.S. Cl. .................................... 358/328; 358/330; 360/22; 360/30; 360/61; 360/33.1
[58] Field of Search ................ 358/310, 327, 328, 334, 358/335, 340, 330; 360/22, 23, 30, 61, 63, 64, 33.1

[56] References Cited

U.S. PATENT DOCUMENTS

| | | | |
|---|---|---|---|
| 4,177,481 | 12/1979 | Yamagiwa et al. | 358/328 X |
| 4,242,699 | 12/1980 | Kobayashi et al. | 358/330 X |
| 4,419,698 | 12/1983 | Shiroishi et al. | 358/328 X |
| 4,467,368 | 8/1984 | Horstmann | 358/310 |
| 4,656,527 | 4/1987 | Nehmi | 358/310 X |

Primary Examiner—W. B. Perkey
Attorney, Agent, or Firm—Wenderoth, Lind & Ponack

[57] ABSTRACT

In a video signal recording/reproducing apparatus for recording and reproducing two-channel component signals, input two-channel component signals are processed separately from each other by two recording signal processing circuits to be recordable two-channel component signals. The recordable two-channel component signals are exchanged at predetermined intervals by a first switching circuit to be two combined signal each containing the recordable two-channel component signals which appear at periods corresponding to the exchanging invervals. The two combined signals are recorded on a recording medium via recording heads and reproduced from the recording medium via reproducing heads. The reproduced two combined signals are exchanged at the predetermined intervals by a second switching circuit to be the recordable two-channel component signals, which are thereafter processed separately from each other by two reproduced signal processing circuit to be the original two-channel component signals.

7 Claims, 8 Drawing Sheets

VIDEO SIGNAL RECORDING/REPRODUCING APPARATUS

BACKGROUND OF THE INVENTION

1. Field of the Invention

This invention relates to a video signal recording/reproducing apparatus such as a video cassette recorder (VCR) for recording two component signals of a video signal on a recording medium such as a magnetic tape and reproducing the recorded signals.

2. Description of the Prior Art

The VCRs for industrial or broadcasting use are designed to record the so-called two-channel (2-ch) component signals of a video signal. The 2-ch component signals are usually a luminance signal and a time-base-compressed-modulated (TBCM) chrominance signal (hereinafter simply referred to as a chrominance signal). For preventing each of the 2-ch component signals from crosstalks between the two channels, a head for one of the 2-ch component signals has a different azimuth angle from that of a head for the other, and a guard band is provided between each adjacent two video tracks on a magnetic tape. This has been an obstacle to increase recording density.

To solve this problem, our previously filed patent application Ser. No. 890,347 (filed July 7, 1986), now U.S. Pat. No. 4,811,119, introduced a method to exchange the 2-ch component signals every nH (n: integer, H: horizontal scanning period) before converting (or frequency-modulating) the 2-ch component signals to recordable signals. That is, the 2-ch component signals are converted to two combined signals each containing the 2-ch component signals appearing alternately at periods of nH. The two combined signals are respectively frequency-modulated and recorded on a magnetic tape in a video track pattern in which each of the 2-ch component signals is aligned in a head width direction, i.e., a direction perpendicular to the longitudinal direction of each video track, so that the influence of crosstalks from an adjacent video track is eliminated. In reproduction, the recorded two combined signals are respectively frequency-demodulated before being exchanged every nH to obtain the 2-ch component signals.

This method has a problem that each of the 2-ch component signals is frequency-modulated or frequency-demodulated by two separate frequency modulators or two separate frequency demodulators. Therefore, the two separate frequency modulators or frequency demodulators must be severely adjusted to have a same performance in DC level, gain, linearity, etc. to accurately reproduce the original 2-ch component signals. Such an adjustment would be troublesome and costly. Further, even if the accurate adjustment would be completed, the performances of the two circuits would be changed by the environmental condition or the life of each circuit element. The performance difference between the two separate circuits for processing the two combined signals will cause a deterioration of the reproduced picture quality.

SUMMARY OF THE INVENTION

Therefore, an object of the invention is to provide a video signal recording/reproducing apparatus for recording and reproducing 2-ch component signals without being affected by crosstalks and without a necessity of sever adjustment of circuitry to produce a high quality of reproduced picture.

According to the present invention, input 2-ch component signals are respectively subjected to recording signal processing including frequency-modulation to be recordable 2-ch component signals. The recordable 2-ch component signals are exchanged at intervals of nH to be two combined signals each containing the recordable 2-ch component signals which appear alternately at periods of nH. The two combined signals are recorded by recording heads on a recording medium in a video track pattern in which same kind of signal recorded portions are adjacent to each other between each adjacent two video tracks. In reproduction mode, the two combined signals reproduced by reproducing heads from the recording medium are soon exchanged at intervals of nH to be the recordable 2-ch component signals. Thereafter, the recordable 2-ch component signals are respectively subjected to reproduced signal processing including frequency demodulation to be the original 2-ch component signals.

Since each of the 2-ch component signals is processed in a same recording signal processing circuit and in a same reproduced signal processing circuit, no variations and degradations of signal will occur in each of the 2-ch component signals. Thus, a high quality of reproduced picture can be always obtained.

The above and other objects and features of the present invention will be apparent from the following description taken in connection with the accompanying drawings in which:

DESCRIPTION OF PREFERRED EMBODIMENT

Figure 1:
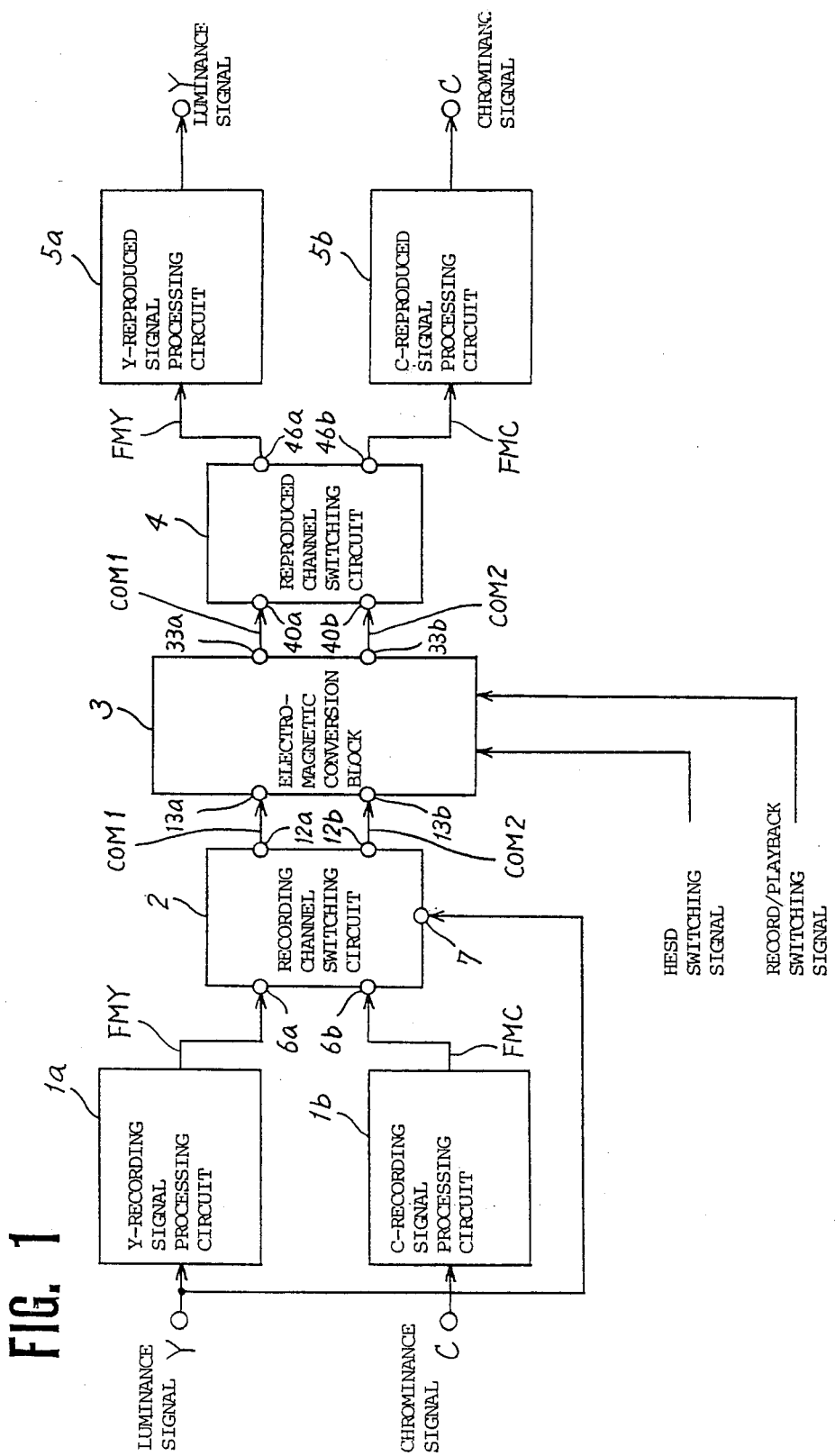
FIG. 1 is a block diagram showing a video cassette recorder as an embodiment of the present invention.

FIG. 1 shows a block diagram of a VCR as an embodiment of the present invention. Input 2-ch component signals are a luminance signal Y (a series of $Y_1$, $Y_2$, $Y_3$, $Y_4$, ...) and a chrominance signal (TBCM chrominance signal containing R-Y and B-Y components) C (a series of $C_1$, $C_2$, $C_3$, $C_4$, ...) as shown as A and B, respectively, in FIG. 5. A Y-recording signal processing circuit 1a mainly frequency-modulates the luminance signal Y to obtain a frequency-modulated luminance signal (FMY signal) which is a recordable luminance signal RY (a series of $RY_1$, $RY_2$, $RY_3$, $RY_4$, ... as shown as F in FIG. 5). A C-recording signal processing circuit 1b mainly frequency-modulates the chrominance signal C to obtain a frequency-modulated chrominance signal (FMC signal) which is a recordable chrominance signal RC (a series of $RC_1$, $RC_2$, $RC_3$, $RC_4$, ... as shown as G in FIG. 5). Each of the Y- and C-recording signal processing circuits 1a and 1b may have arbitrary carrier frequency and frequency deviation for frequency-modulation which may be either equal to or different from those of the other.

Figure 5:
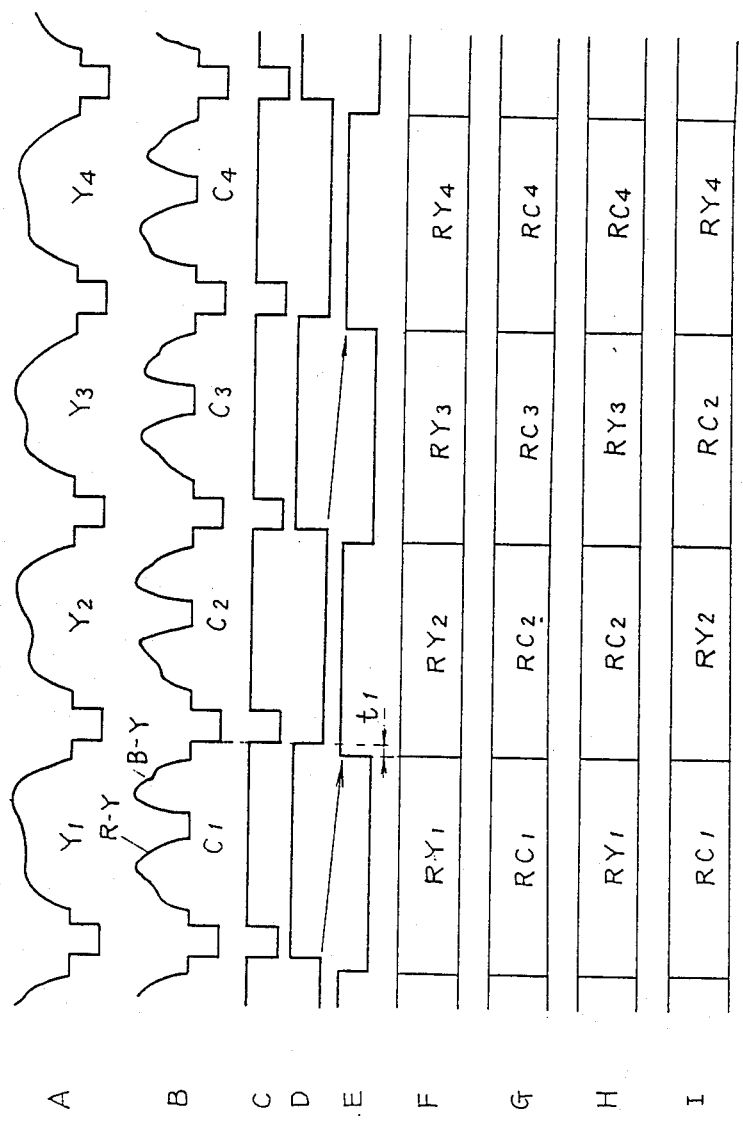
FIG. 5 is a signal timing chart for explaining a recording operation of the embodiment of FIG. 1.

A recording channel switching circuit 2 exchanges the FMY signal RY and the FMC signal RC at intervals of H to obtain two combined signals COM1 (a series of $RY_1$, $RC_2$, $RY_3$, $RC_4$, ... as shown as H in FIG. 5) and COM2 (a series of $RC_1$, $RY_2$, $RC_3$, $RY_4$, ... as shown as I in FIG. 5). In each of the two combined signals COM1 and COM2, the FMY signal and the FMC signal appear alternately at periods of H.

Figure 2:
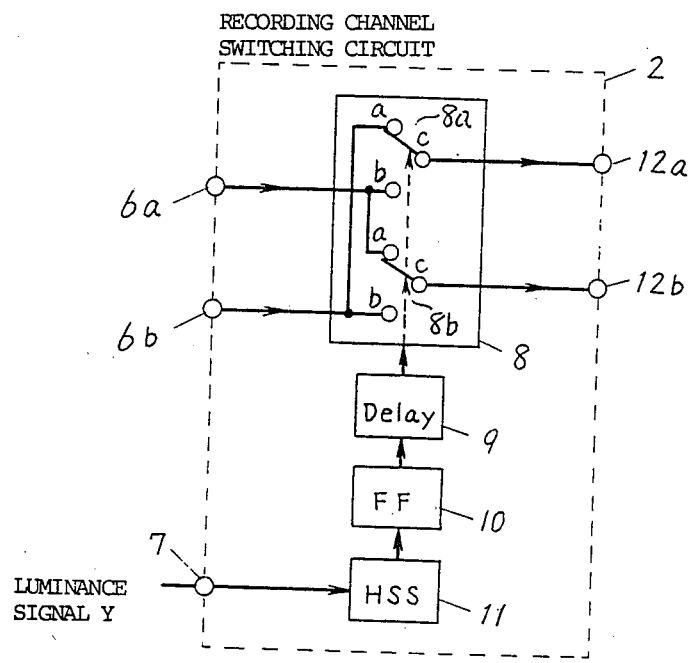
FIG. 2 is a block diagram showing an example of recording channel switching circuit used in the embodiment of FIG. 1.

A detailed block diagram of the recording channel switching circuit 2 is shown in FIG. 2. An exchanging switch 8 consists of two changeover switches 8a and 8b each having a first terminal a, a second terminal b and a common terminal c. An input terminal 6a of the switching circuit 2 for feeding the FMY signal is connected to the second terminal b of the changeover switch 8a and the first terminal a of the changeover switch 8b. An input terminal 6b of the switching circuit 2 for feeding the FMC signal is connected to the first terminal a of the changeover switch 8a and the second terminal b of the changeover switch 8b. The common terminal c of the changeover switch 8a is connected to an output terminal 12a of the switching circuit 2 at which the combined signal COM1 appears. The common terminal c of the changeover switch 8b is connected to an output terminal 12b of the switching circuit 2 at which the combined signal COM2 appears. Each of the two changeover switches 8a and 8b selects the first and second terminals a and b alternately at intervals of H in response to a control signal as shown as E in FIG. 5.

This control signal is obtained from the input luminance signal Y fed from a terminal 7 of the switching circuit 2. A horizontal synchronizing signal separation circuit (HSS circuit) 11 separates horizontal synchronizing signals as shown as C in FIG. 5 from the luminance signal Y. A flip-flop (FF) circuit 10 inverts its output state at a leading edge of every horizontal synchronizing signal as shown as D in FIG. 5. The output signal of the FF circuit 10 is delayed by a delay circuit 9 for a predetermined time to obtain the control signal which inverts its state at a timing which is a short time $t_1$ before the leading edge of each horizontal synchronizing signal as shown in FIG. 5.

Figure 3:
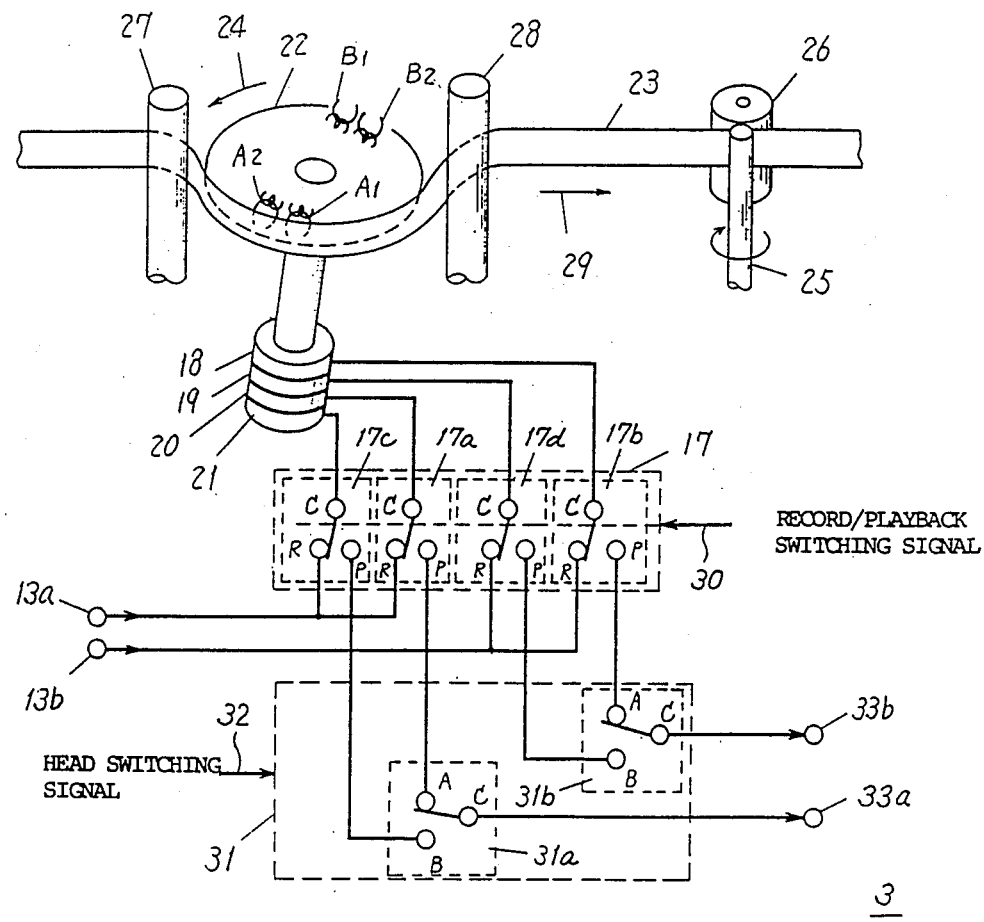
FIG. 3 is a block diagram showing an example of electromagnetic conversion block used in the embodiment of FIG. 1.

The two combined signals COM1 and COM2 obtained by the recording channel switching circuit 2 are respectively applied to input terminals 13a and 13b of an electromagnetic conversion block 3, a detailed block diagram of which is shown in FIG. 3. Four rotary magnetic heads $A_1$, $A_2$, $B_1$ and $B_2$ are mounted on a rotary disk 22 which is rotating at a speed of about 30 Hz in a direction indicated by an arrow 24. A magnetic tape 23 is driven by a capstan 25 and a pinch roller 26 to move in a direction indicated by an arrow 29 by the guidance of guide posts 27 and 28. The magnetic tape 23 contacts the cylindrical surface of the rotary disk 22 at an area ranging about 180° C. The magnetic heads $A_1$ and $A_2$ are disposed close to each other, and the magnetic heads $B_1$ and $B_2$ are disposed close to each other. The magnetic heads $A_1$ and $B_1$ are disposed apart by 180° from each other, and the magnetic heads $A_2$ and $B_2$ are disposed apart by 180° from each other. Rotary transformers 20, 18, 21 and 19 mounted on the rotational shaft of the rotary disk 22 are respectively coupled to the magnetic heads $A_1$, $A_2$, $B_1$ and $B_2$.

A record/playback switching circuit 17 comprises four change over switches 17a, 17b, 17c and 17d each of which has a common terminal c, a record terminal R and a playback terminal P and is controlled by a record/playback switching signal 30 to connect the common terminal c to the record terminal R in a recording mode and connect the common terminal c to the playback terminal P in a playback (or reproducing) mode. The record/playback switching signal is well-known in the art. The common terminals c of the change over switches 17a–17d are respectively connected to the rotary transformers 20, 18, 21 and 19. The record terminals R of the change over switches 17a and 17c are connected in common to the first input terminal 13a, and the record terminals R of the change over switches 17b and 17d are connected in common to the second input terminal 13b.

A head switching circuit 31 comprises two change over switches 31a and 31b each of which has a common terminal c, a A-head terminal A and a B-head terminal B and is controlled by a head switching signal 32 to connect the common terminal c to the A-head terminal A when the magnetic heads $A_1$ and $A_2$ are scanning the magnetic tape 23 and connect the common terminal c to the B-head terminal B when the magnetic heads $B_1$ and $B_2$ are scanning the magnetic tape 23, in the playback mode. The head switching signal 32 is a 2-state signal inverting its state every half turn of the rotary disk 22 and is well-known in the art. The A-head and B-head terminals A and B of the change over switch 31a are respectively connected to the playback terminals P of the change over switches 17a and 17c of the record/playback switching circuit 17, and the A-head and B-head terminals A and B of the change over switch 31b are respectively connected to the playback terminals P of the change over switches 17b and 17d of the record/playback switching circuit 17. The common terminals c of the change over switches 31a and 31b are respectively connected to first and second output terminals 33a and 33b of the electromagnetic conversion block 3.

The combined signals COM1 and COM2 inputted to the input terminals 13a and 13b are transmitted through the record/playback switching circuit 17 and the rotary transformers 18–21 to the magnetic heads $A_1$, $A_2$, $B_1$ and $B_2$. More specifically, the combined signal COM1 inputted to the input terminal 13a is transmitted through the change over switches 17a and 17c and the rotary transformers 20 and 21 to the magnetic heads $A_1$ and $B_1$, and the combined signal COM2 inputted to the input terminal 13b is transmitted through the change over switches 17b and 17d and the rotary transformers 18 and 19 to the magnetic heads $A_2$ and $B_2$. During a first half turn of the rotary disk 22, the magnetic heads $A_1$ and $A_2$ scan the magnetic tape 23 to respectively record the two combined signals in the form of two adjacent video tracks on the magnetic tape 23. During a second half turn of the rotary disk 22 next to the first half turn, the magnetic heads $B_1$ and $B_2$ scan the magnetic tape 23 to respectively record the two combined signals in the form of two adjacent video tracks adjacent to the two adjacent video tracks formed by the magnetic heads $A_1$ and $A_2$ on the magnetic tape 23.

Figure 6:
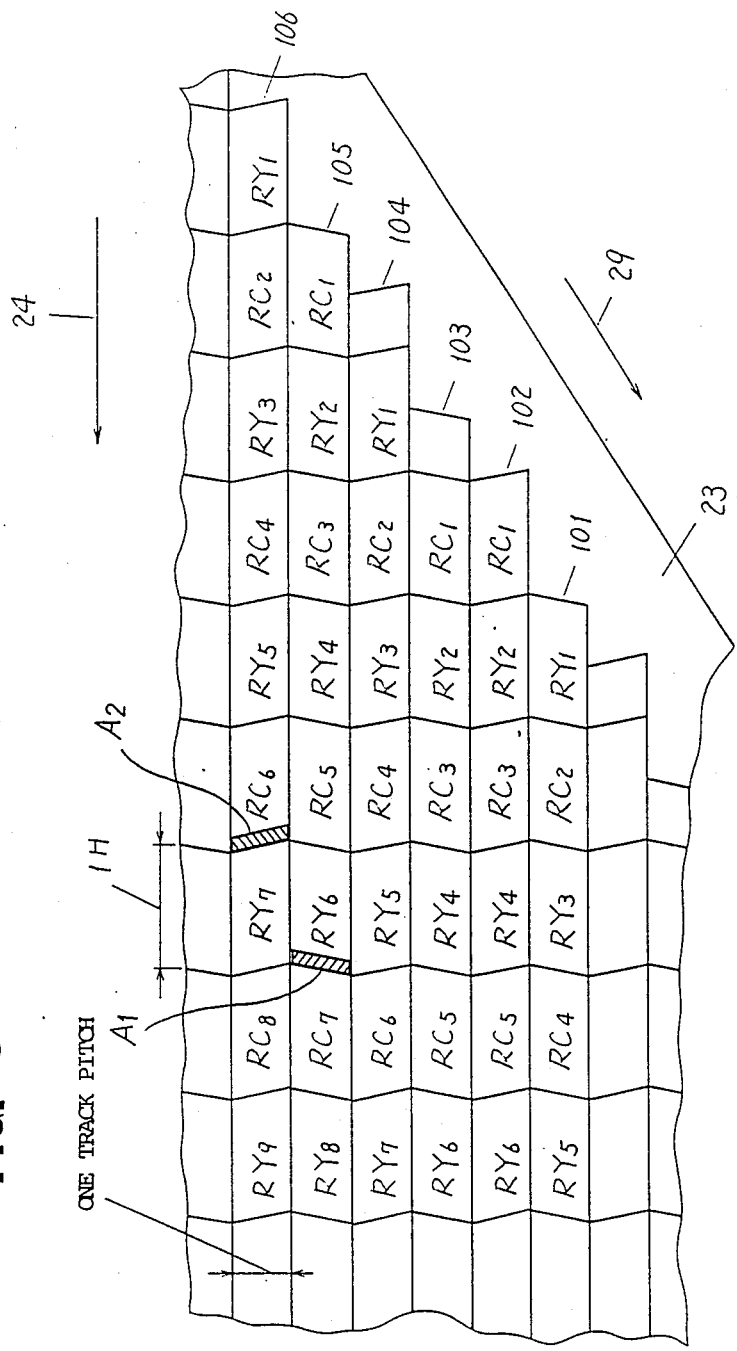
FIG. 6 is a video track pattern on a magnetic tape obtained by the embodiment of FIG. 1.

FIG. 6 shows a video track pattern on the magnetic tape 23, in which an arrow 24 indicates a scanning direction of each magnetic head $A_1$, $A_2$, $B_1$ or $B_2$ and an arrow 29 indicates a moving direction of the magnetic tape 23. In FIG. 6, video tracks 101 and 105 are formed by the magnetic head $A_1$, video tracks 102 and 106 by the magnetic head $A_2$, a video track 103 by the magnetic head $B_1$, and a video track 104 by the magnetic head $B_2$. Each of the signals recorded on the video tracks 101, 103 and 105 is the combined signal COM1, and each of the signals recorded on the video tracks 102, 104 and 106 is the combined signal COM2.

The magnetic heads $A_1$ and $A_2$ are disposed so that they are shifted from each other by a distance corresponding to 1H period in the head moving (rotating) direction and by one track pitch in the vertical direction, i.e., in the track pitch (or track width) direction as shown in FIG. 6. Preferably, the magnetic heads $A_1$ and $A_2$ are positioned to be different in azimuth angle from each other as shown in FIG. 6 to enable azimuth recording. The magnetic heads $B_1$ and $B_2$ are disposed in the same way as the disposition of the magnetic heads $A_1$ and $A_2$. With this arrangement of the magnetic heads, (1) the signal tracks are formed without an unrecorded space between each adjacent two thereof, and (2) a luminance signal recorded block ($RY_1$, for example) of each video track (101, for example) is adjacent to another luminance signal recorded block ($RY_2$) of an adjacent video track (102) and a chrominance signal recorded block ($RC_2$, for example) of each video track (101, for example) is adjacent to another chrominance signal recorded block ($RC_3$) of an adjacent video track (102).

In other words, each video track (101, for example) is composed of a plurality of blocks on which the luminance signal and chrominance signal are alternately recorded (as $RY_1$, $RC_2$, $RY_3$, $RC_4$, $RY_5$, ...), each block having a length (in the longitudinal direction of the track) corresponding to 1H period. At each boarder of each block exists a horizontal synchronizing signal. The horizontal synchronizing signals on each signal track, are respectively adjacent to the horizontal synchronizing signals on an adjacent signal track so that the blocks are aligned in the track pitch direction perpendicular to the track length direction. The blocks arranged in a line in the track pitch direction contain a same kind signal, i.e. the luminance signal (as $RY_1$, $RY_2$, $RY_2$, $RY_3$, $RY_4$, $RY_5$, ..., for example) or the chrominance signal (as $RC_2$, $RC_3$, $RC_3$, $RC_4$, $RC_5$, $RC_6$, ..., for example). Since each two adjacent blocks in the track pitch direction contain a same kind signal, the signal on each block is little interfered by the cross talk of the signal on an adjacent block. Since there are no unrecorded spaces such as the conventional guard bands, the recording density can be remarkably increased.

In a playback (or reproduction) mode, each of the change over switches 17a–17d of the record/playback switching circuit 17 in FIG. 3 connects the common terminal c to the playback terminal P, and each of the change over switches 31a and 31b of the head switching circuit 31 connects the common terminal c to the A-head terminal A when the magnetic heads $A_1$ and $A_2$ are scanning the magnetic tape and to the B-head terminal B when the magnetic heads $B_1$ and $B_2$ are scanning the magnetic tape in response to the head switching signal. The correspondence between each magnetic head and the video tracks scanned thereby is the same as that in the recording mode. Thus, the reproduced combined signals COM1 and COM2 as shown as J and K in FIG. 7 respectively corresponding to the combined signals COM1 and COM2 as shown as H and I in FIG. 5 are obtained at output terminals 33a and 33b, respectively, of the electromagnetic conversion block 3.

Figure 4:
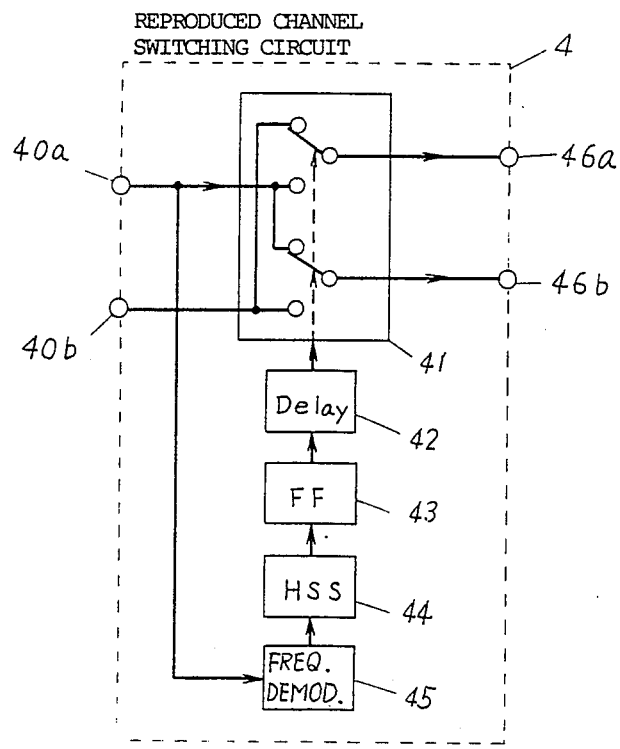
FIG. 4 is a block diagram showing an example of reproduced channel switching circuit used in the embodiment of FIG. 1.

Referring to FIG. 1, the reproduced combined signals COM1 and COM2 are respectively applied to input terminals 40a and 40b of a reproduced channel switching circuit 4, a detailed block diagram of which is shown in FIG. 4. Referring to FIG. 4, an exchanging switch 41 has the same configuration as that of the exchanging switch 8, and operates to exchange the two combined signals COM1 and COM2 which are shown as J and K in FIG. 7 at intervals of H to obtain the FMY signal (shown as P in FIG. 7) and the FMC signal (not shown in FIG. 7) which appear respectively at output terminals 46a and 46b of the switching circuit 4.

Figure 7:
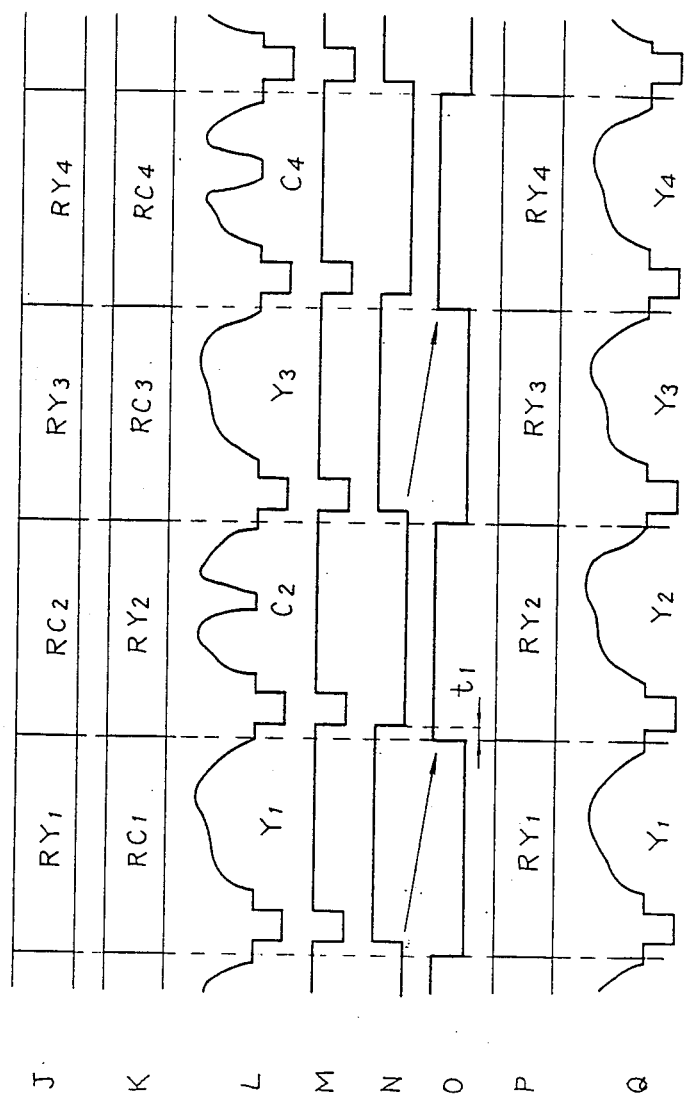
FIG. 7 is a signal timing chart for explaining a reproducing operation of the embodiment of FIG. 1.

A frequency demodulator 45 frequency-demodulates the combined signal COM1 inputted to the input terminal 40a to obtain a frequency-demodulated combined signal as shown as L in FIG. 7. A HSS circuit 44 separates horizontal synchronizing signals as shown as M in FIG. 7 from the frequency-demodulated combined signal. A FF circuit 43 inverts its output state at a leading edge of each horizontal synchronizing signal as shown as N in FIG. 7. A delay circuit delays the output signal of the FF circuit 43 for a predetermined time to obtain a control signal for controlling the exchanging switch 41 so that the control signal inverts its state at a timing the time $t_1$ before the leading edge of each horizontal synchronizing signal as shown as 0 in FIG. 7. The delay time of the delay circuit 42 is the same as that of the delay circuit 9.

Referring again to FIG. 1, the FMY signal outputted from the output terminal 46a of the reproduced channel switching circuit 4 is processed, or mainly frequency-demodulated, by a Y-reproduced signal processing circuit 5a to be the original luminance signal Y as shown as Q in FIG. 7. The FMC signal outputted from the output terminal 46b of the switching circuit 4 is processed, or mainly frequency-demodulated, by a C-reproduced signal processing circuit 5b to be the original chrominance signal C (not shown in FIG. 7.

As described above, the 2-ch component signals are frequency-modulated separately from each other before being converted to the two combined signals, and the two combined signals reproduced from the magnetic tape are converted to the FM 2-ch component signals before the FM 2-ch component signals are frequency-demodulated. Therefore, since each of the 2-ch component signals is subjected to a same signal processing including frequency-modulation and frequency-demodulation, the characteristics of each of the 2-ch component signals will not vary even if it is combined with the other in the electromagnetic conversion block.

Each of the recording signal processing circuits 1a and 1b may include an emphasis circuit and other known circuit at need, and each of the reproduced signal processing circuits 5a and 5b may include a deemphasis circuit and other known circuit at need.

In the above-described embodiment, the signal exchanging timing at each of the switching circuits 2 and 4 is positioned before the leading edge of each horizontal synchronizing signal. But, the signal exchanging timing may be positioned after the trailing edge of each horizontal synchronizing signal by changing the delay time of each of the delay circuits 9 and 42. In this case, the signal timing chart becomes as shown in FIG. 8.

Figure 8:
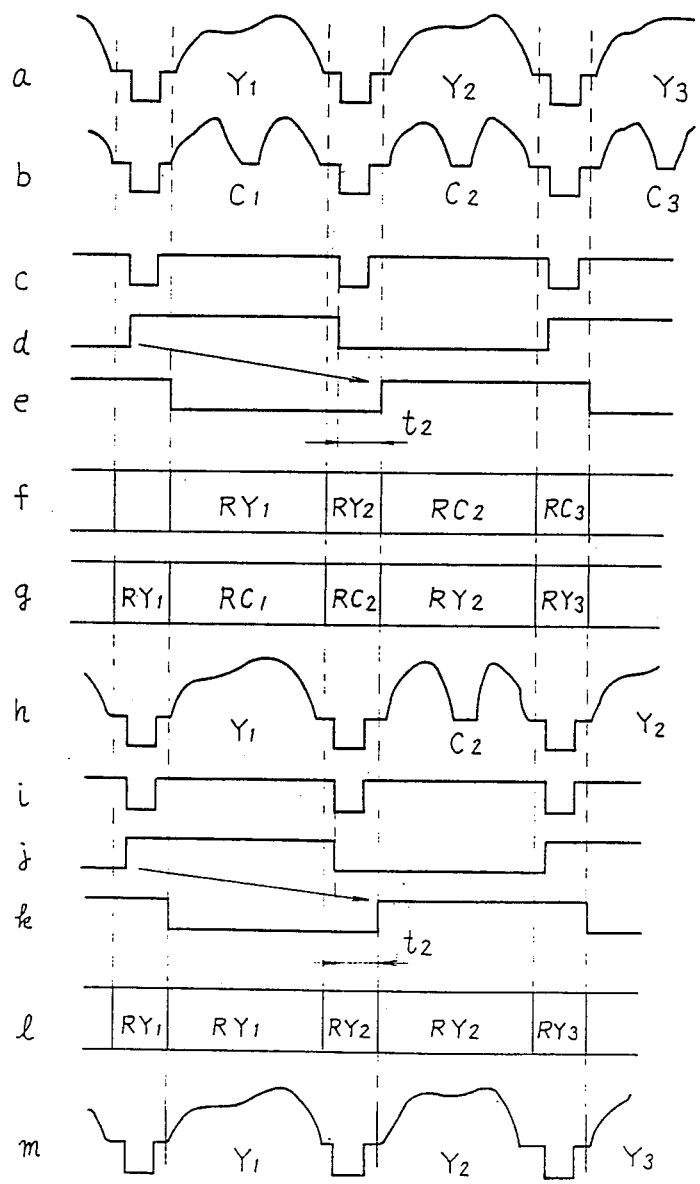
FIG. 8 is a signal timing chart for explaining another recording and reproducing operation of the embodiment of FIG. 1.

In FIG. 8, a shows the luminance signal Y; b, the chrominance signal C; c, the horizontal synchronizing signals separated from Y; d, the output signal of the FF circuit 10; e, the control signal for the switch 8; f, the combined signal COM1; g, the combined signal COM2; h, the frequency-demodulated combined signal; i, the horizontal synchronizing signals separated from the frequency-demodulated combined signal; j, the output signal of the FF circuit 43; k, the control signal for the switch 41; l, the reproduced FMY signal; and m, the reproduced luminance signal Y. Each of the control signals (e and k) inverts its state at a timing delayed for $t_2$ from the leading edge of each horizontal synchronizing signal. The time $t_2$ is longer than the duration of each horizontal synchronizing signal. Thus, the signals are exchanged at the timing after the trailing edge of each horizontal synchronizing signal. This is advantageous in that there would be no fear that the horizontal synchronizing signal is disturbed by a spike signal which would be produced at the signal exchanging timing.

In the above embodiment, the luminance signal and the TBCM chrominance signal are used as the 2-ch component signals. But, any other kinds of 2-ch component signals may be used. Further, the interval for exchanging the signals may be nH (n: any integer) instead of H. Further, each of the horizontal synchronizing signals may not be a pulse signal, but may be a burst signal.

What is claimed is:

1. A video signal recording/reproducing apparatus for recording two-channel component signals of a video signal on a recording medium and reproducing the recorded signals, comprising:
   a first recording signal processing circuit for processing a first component signal of said two-channel component signals to obtain a recordable first component signal;
   a second recording signal processing circuit for processing a second component signal of said two-channel component signals to obtain a recordable second component signal;
   a first switching circuit for exchanging said recordable first and second component signals at intervals of nH, wherein n: any integer, and H: horizontal synchronizing signal, to obtain two combined signals each containing said recordable first and second component signals which appear alternately at periods of nH;
   an electromagnetic conversion means for recording said two combined signals on said recording medium and for reproducing said recorded two combined signals from said recording medium;
   a second switching circuit for exchanging said two combined signals reproduced from said electromagnetic conversion means at intervals of nH to obtain said recordable first and second component signals;
   a first reproduced signal processing circuit for processing said recordable first component signal from said second switching circuit to obtain said first component signal; and
   a second reproduced signal processing circuit for processing said recordable second component signal from said second switching circuit to obtain said second component signal.

2. The apparatus according to claim 1, wherein said first switching circuit comprises a control signal generating circuit for generating from horizontal synchronizing signals of said first component signal a control signal which inverts its state at intervals of nH, and a switch responsive to said control signal for exchanging said recordable first and second component signals at intervals of nH to obtain said two combined signals.

3. The apparatus according to claim 2, wherein said control signal inverts its state at each timing before a leading edge of or after a trailing edge of each of said horizontal synchronizing signals.

4. The apparatus according to claim 1, wherein said second switching circuit comprises a frequency-demodulator for frequency-demodulating one of said two combined signals reproduced from said electromagnetic conversion means, a control signal generating circuit for generating from horizontal synchronizing signals of the frequency-demodulated combined signal a control signal which inverts its state at intervals of nH, and a switch responsive to said control signal for exchanging said two combined signals reproduced from said electromagnetic conversion means at intervals of nH to obtain said recordable first and second component signals.

5. The apparatus according to claim 4, wherein said control signal inverts its state at each timing before a leading edge of or after a trailing edge of each of said horizontal synchronizing signals.

6. The apparatus according to claim 1, wherein said recording medium is a magnetic tape, and said electromagnetic conversion means comprises two pairs of rotary magnetic heads mounted on a rotary disk, each of said two pairs comprising first and second rotary magnetic heads which are disposed to be shifted from each other by a distance corresponding to nH period in a rotating direction thereof and by a distance equal to one video track pitch on said magnetic tape in a vertical direction, said first and second rotary magnetic heads of one of said two pairs being respectively apart by 180° from those of the other of said two pairs in the rotating direction, whereby said two combined signals are recorded on said magnetic tape to form video tracks without any spaces between each adjacent two thereof corresponding respectively to said two combined signals so that each of said video tracks is composed of a plurality of blocks each having a length corresponding to nH period and each adjacent two blocks of each adjacent two video tracks contain a same one of said recordable first and second component signals.

7. The apparatus according to claim 6, wherein said first component signal is a luminance signal and said second component signal is a chrominance signal.

* * * * *